No. 808,074. PATENTED DEC. 26, 1905.
J. C. DUFOUR.
TIRE COVER.
APPLICATION FILED APR. 3, 1905.

Witnesses:
Pierre Paris
Georges Auvray

Inventor
Jean Claude Dufour

UNITED STATES PATENT OFFICE.

JEAN CLAUDE DUFOUR, OF CHARENTON, FRANCE.

TIRE-COVER.

No. 808,074.      Specification of Letters Patent.      Patented Dec. 26, 1905.

Application filed April 3, 1905. Serial No. 253,513.

*To all whom it may concern:*

Be it known that I, JEAN CLAUDE DUFOUR, a citizen of the French Republic, residing at 14 Rue de la Cerisaie, Charenton, Department de la Seine, France, have invented certain new and useful Improvements in Protective and Antiskidding Tire-Covers for the Wheels of Automobile-Carriages or other Vehicles, of which the following is a specification, such as will enable others skilled in the art to which it appertains to make and use the same.

The objects of the present invention are, first, to make the pneumatic tire more durable; secondly, to prevent wearing of the outer cover; thirdly, to produce an impermeable and antiskidding pneumatic tire; fourthly, to make the tire supple, and, finally, to effect various improvements, as will be seen in the description.

Figure 1:
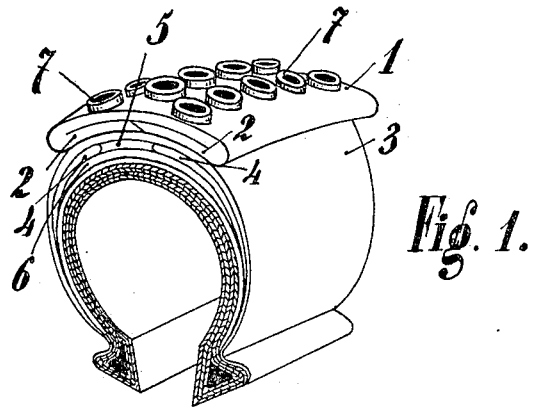
Figure 2:
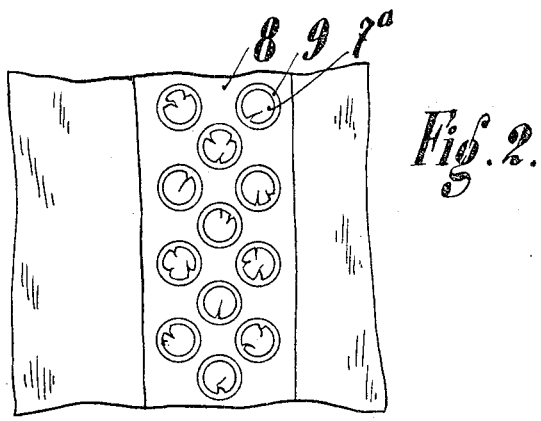
Figure 3:
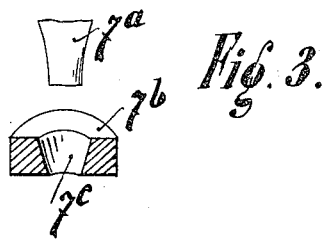

Referring to the drawings which form a part of this specification, Figure 1 is a section and perspective view of part of the protective and antiskidding cover, having a tread provided with rivets or studs and rivet sleeves or rings surrounding the studs. Fig. 2 shows a portion of the interior of the protecting-band. Fig. 3 represents a section of the rivet-sleeve, showing the conical bore of the said sleeve and the rivet.

The pneumatic tire is composed of an outer band or tread 1, made of leather, the edges 2 of which are folded inward and joined, so that a double tread-band is formed. This folded tread-band is placed on a leather cover 3, which completely surrounds the air-tube. This cover rests on a leather crescent-shaped layer 4, composed of two parts with free space or gap 5 between them, forming an annular chamber or passage intended to make the pneumatic cover supple and to enable the center row of studs on the tread when pressed to sink into the cover without cutting it. The crescent-shaped layer 4 is placed over another similar layer 6, which is continuous—that is to say, without any empty space or gap. These different leather parts joined together in suitable manner are fixed over the air-tube in the manner already known.

To make the pneumatic tire more durable, to prevent wearing of the outer cover, and to produce an unpuncturable and non-skidding pneumatic tire, the tread 1 has a variable number (preferably three rows) of studs or rivets 7. These studs or rivets are of special construction, as now about to be described. They are composed, first, of a rivet $7^a$; secondly, of a sleeve $7^b$, which surrounds the rivet, and, thirdly, of an interior washer or ring 9. The rivet $7^a$ and the rivet-shank may be of any form and size. The sleeve $7^b$, forming an antiskid, is about sixteen millimeters in diameter. It is five millimeters thick and, what is important, has a central conical bore $7^c$, Fig. 3, so that when the rivet $7^a$ is clenched the bore $7^c$ is completely filled, whereby the plate $7^b$ can become worn without being able to separate from the rivet.

The fixing of the rivets may be effected in any suitable manner, by riveting, &c.; but experience has shown that the rivets, either through wear or through the strain caused by skidding, cut the leather of the cover, which is a serious disadvantage at the present time. In order to obviate this disadvantage, the invention provides improvements which consist in, first, an intermediate leather band 8, which is adhesively attached to the interior of the leather cover 3 over the whole length, so as to form a strengthening-band, and, secondly, a washer 9, made of parchment, leather, cardboard, metal, or any other suitable material placed between the intermediate band 8 and the rivet-shank $7^a$ and intended in the case of strain through skidding to prevent the rivet from cutting the leather of the cover. This piece 9 is here represented in the form of a washer; but it may also be in the form of a band of leather, cardboard, metal, or any other suitable material without the principle of the invention being changed.

It is evident that thus in accordance with the ideas of the invention lissome impermeable pneumatic tires may be constructed specially suitable, for example, for the front wheels of automobile-carriages. These pneumatic tires differ from those previously described in not having any separate tread-band, studs 7, or rivets, but only the annular chamber 5, which imparts suppleness and prevents heating.

Having now described my invention, what I claim as new, and desire to secure by Letters Patent, is—

1. In protective and non-skidding tire-covers for the wheels of automobile-carriages or other vehicles the combination of a double tread placed exteriorly on a leather cover which completely surrounds the air-tube; studs or rivets on the tread-band to produce an unpuncturable and non-skidding pneumatic tire; means for preventing the leather of the cover to be cut by the rivets, said means consisting in an intermediate leather band and washers; a leather crescent-shaped layer composed of two parts with a free space or gap between them; another similar continuous layer.

2. In protective and non-skidding tire-covers for the wheels of automobile-carriages or other vehicles the combination of a leather tread-band the edges of which are folded inward and joined so that a double tread-band is formed and placed on a leather cover which completely surrounds the air-tube; studs or rivets on the tread-band to produce an unpuncturable and non-skidding pneumatic tire, said studs composed of a rivet, a sleeve surrounding the rivet and having a central conical bore, so that when the rivet is clenched the bore is completely filled; means for preventing the leather of the cover to be cut by the rivets, said means consisting in an intermediate leather band adhesively attached to the interior of the leather cover over the whole length, so as to form a strengthening-band and in washers made of parchment &c. placed between the intermediate band above named and the rivet-shank; a leather crescent-shaped layer composed of two parts provided with a free space between them forming an annular chamber or passage intended to make the pneumatic cover supple and to enable the center row of studs on the tread, when pressed, to sink into the cover without cutting it; another similar continuous layer placed between the above-named crescent-shaped layer and the pneumatic tire.

In testimony whereof I have affixed my signature in presence of two witnesses.

JEAN CLAUDE DUFOUR.

Witnesses:
 HENRI BURGI,
 HANSON C. COXE.